Dec. 9, 1969 T. C. MURRAY 3,482,917

CARD TRANSPORT APPARATUS

Filed Sept. 2, 1966 2 Sheets-Sheet 1

INVENTOR.
THOMAS C. MURRAY
BY B. A. Chiama
ATTORNEY

INVENTOR.
THOMAS C. MURRAY
BY B. A. Chiama
ATTORNEY

United States Patent Office 3,482,917
Patented Dec. 9, 1969

3,482,917

CARD TRANSPORT APPARATUS

Thomas C. Murray, Rochester, N.Y., assignor to Xerox Corporation, Rochester, N.Y., a corporation of New York Filed Sept. 2, 1966, Ser. No. 577,039
Int. Cl. G03b *27/62*
U.S. Cl. 355—75 3 Claims

ABSTRACT OF THE DISCLOSURE

Apparatus for transporting data cards past a scan slit of a copying machine. Card feed apparatus deposits cards in seriatim onto a movable carriage comprising a platen member and a pressure plate member. Arranged on the pressure plate member are rails to hold the data card by the edges thereof so that the data card can be inserted and ejected without touching a sensitive film surface arranged on the card.

Figure 1:
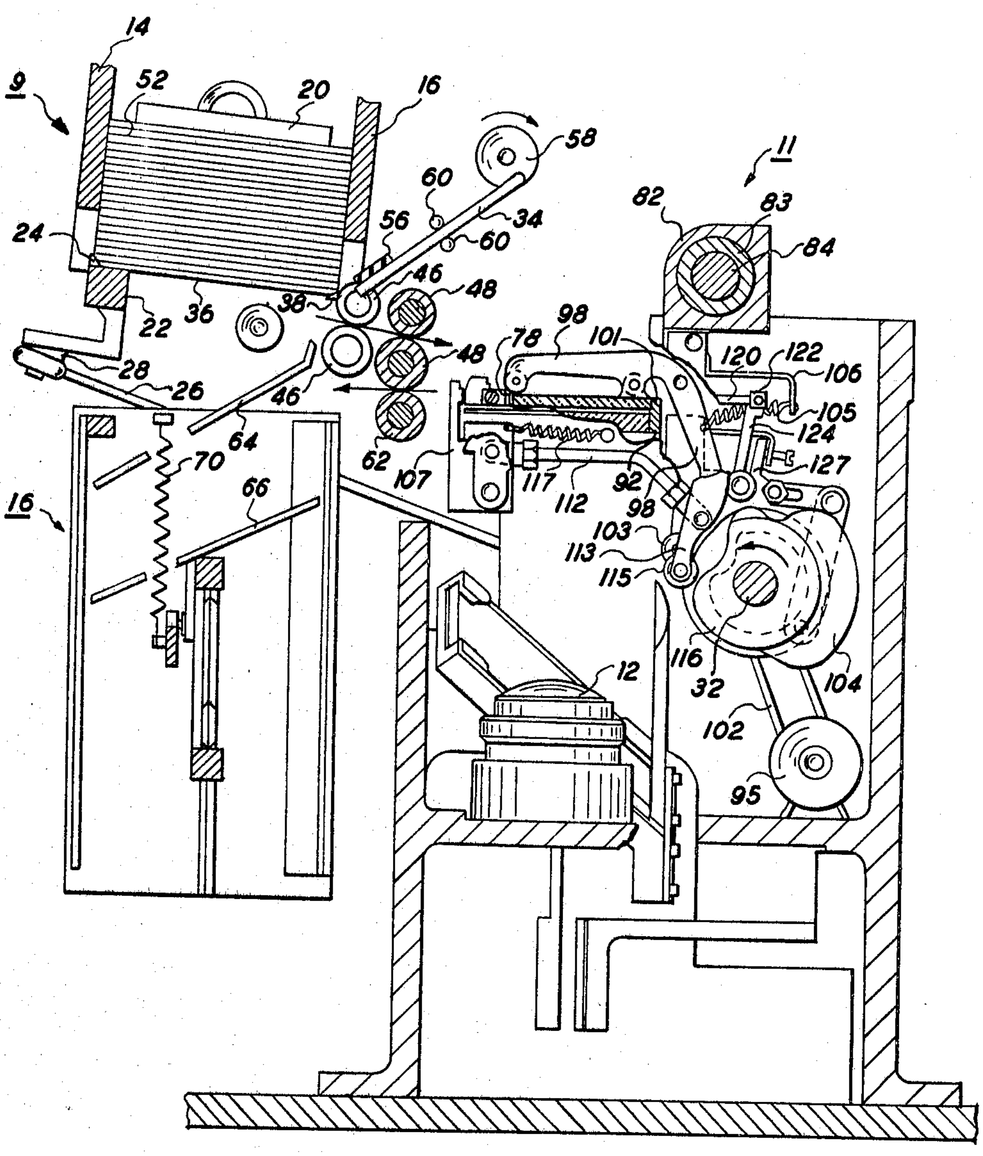

This invention relates to apparatus for transporting articles and particularly to apparatus for transporting image bearing data cards over a scan slit of a copying machine.

As it is well known, in recent years, the steadily increasing size of various industries has required an enormous increase in the number and variety of business records that must be made, maintained and kept available for use. The increasing enormity of records and files made this phase of the business increasingly expensive and burdensome to the point that it was becoming economically unfeasible to continue by conventional techniques. As one facet of the record-keeping problem, the mere protection of the records of a business may be considered as a safeguard against the destruction of records by fire, flood, or other disaster, it became a common practice, periodically, to microfilm a concern's records and to store these microfilms at locations and under conditions to prevent their inadvertent destruction. Although this technique was affected to preserve the records for a possible future reference, it merely added another expense to the record-keeping burden without, in any way, simplifying the handling or maintaining of records. This condition was inherent, first, since the primary purpose was to remove the microfilm records from everyday use, and second, because of the relative inaccessibility of the selected records contained are in such microfilm.

There has been developed a system for making microfilm records whereby such records may be maintained under conditions of relative security from destruction and, at the same time, be available for day-to-day use. This system is generally known as a "unitized" microfilm system and comprises the basic steps of (1) copying onto microfilm: original drawings, tracings, memoranda, reports or other records likely to require reproduction at a later date; (2) mounting the individual microfilm frames into the apertures of microfilm data processing cards, which may be designated by coded perforations for use in conventional card control machines; and (3) using such microfilm cards for the reproduction of the film information thereon.

In the use of the conventional microfilm reproduction apparatus, the input comprises a conventional record card of the type widely used in record-controlled accounting and tabulating systems, but is provided with an aperture in which a microfilm frame may be inserted and permanently secured to the card. When a microfilm frame of data to be reproduced is so mounted in a microfilm card, the card may also be key punched with appropriate holes and notches representing certain descriptive terms defining, identifying or relating to the microfilm picture and plate in an index file. Thereafter, these cards may be manually or machine sorted or otherwise processed when the index file is integrated in accordance with conventional uses of such cards.

The unitized microfilm system saves the user valuable time that was previously lost by waiting for engineering prints. It has the further convenience of saving space since approximately 2,000 sq. ft. of storage space, needed for 6,000 conventional engineering drawings and the like is reduced to 50 sq. ft. by using microfilm aperture cards. The added benefits of lack of wear and tear on original drawings and efficient and accurate control of active drawings when combined with the easy accessibility of locating and refiling the aperture cards are also important to industry.

A consistent problem with aperture cards, however, is their handling, in that the microfilm surface implanted in the aperture of such cards is relatively delicate and easily susceptible to scratching and scarring. This may occur whenever a card is moved relative to a surface with which it is in frictional contact. Many of the uses of the "unitized" microfilm system requires a movement of a card relative to a surface upon which it rests. One such operation involving an aperture card occurs during the copying and enlarging of images implanted in the card in a xerographic processing system utilizing a stationary scanning slit. The card must traverse the slit in order to have the images thereon enlarged and copied by the xerographic processing system.

Before the invention here, the aperture card was removed from the bottom of a stack of such cards, transported to an exposure magazine (the path of which traversed a stationary scanning slit), placed against a glass platen, and moved across the scanning slit. The transportation caused a relative motion between the exposure magazine surfaces. Since the card is moved into and out of the exposure magazine without first removing the sensitive surfaces of the card from contact with the glass platen image area on the card is quite apt to be, and in fact, often is, scratched or scarred or in some other way damaged. This invention eliminates that difficulty by eliminating surface contact during the relative motion between the card and the exposure magazine of the copying system.

The invention here works not only for aperture cards of the type employed in the "unitized" microfilm system but also in a semi-micro system utilizing opaque data cards with images thereon reduced approximately 3×. The improvements provided by this invention are equally applicable to the two systems and the implementation of apparatus to prevent image damage during handling of either type of card is the same.

An object of this invention is to improve the handling of articles with sensitive surfaces. Another object of this invention is to improve the handling of microfilm aperture cards having a sensitive surface implanted therein.

Yet another object of this invention is to prevent damaging of the sensitive surface of an image bearing card while it is fed to, and removed from, a position traversing the scan slit of a copying apparatus.

Still another object of this invention is to firmly maintain an image bearing card while transporting it to and from and presenting it across a stationary scanning slit without permitting frictional contact between the sensitive surface of said card and the cover of said slit.

These and other objects of the invention are obtained by means of an apparatus for positioning and clamping an aperture card on a movable carriage adapted to traverse a scan slit of a copying apparatus, physically moving the card across the scanning slit without frictional contact of the sensitive surface of such card, and presenting the card to an eject position and releasing the card without touching or contacting the sensitive surface of the card.

Figure 2:
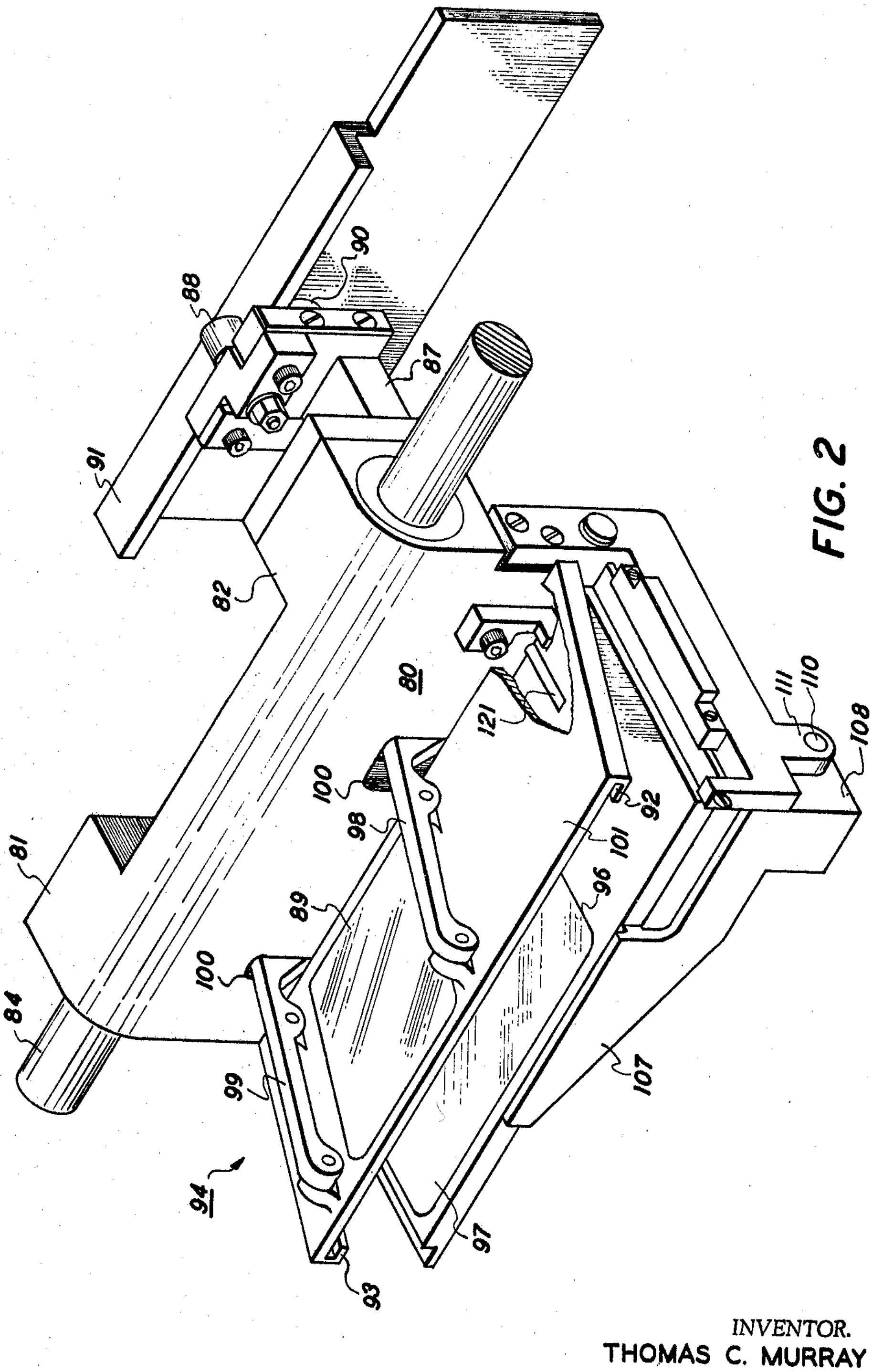

For a better understanding of the invention, as well as other objects and further features thereof, reference is had to the following detailed description of the invention to be read in conjunction with the accompanying drawings wherein:

FIG. 1 is a side elevation, partly in section, of card handling and scanning apparatus in conjunction with a card feeding apparatus; and FIG. 2 is an isometric view of the card handling-scanning apparatus.

Referring now to the drawings wherein like numerals designate like elements, there is shown in FIG. 1 a card handling and scanning apparatus overlying an objective lens assembly 12 of an optical system of a card copying apparatus. For a machine incorporating such copying apparatus see the Patent No. 3,379,106, issued Apr. 23, 1968 in the name of E. D. Hewes.

In the system disclosed herein, sheets in the form of data cards are placed in the card magazine 9 from which they are fed seriatim to a card transport in a card carriage and handling apparatus, generally designated by reference character 11, arranged to the rear of the card magazine assembly. Suitable driving means are provided for the card carriage whereby it is caused to move the card past the optical axis of the light projecting system of a copier apparatus for the purpose of scanning the image data on the card across a stationary scanning light line. The illuminated card is projected downwardly by means of an objective lens assembly 12, through a variable slit aperture assembly and onto a photosensitive surface. If aperture cards are used, a direct illumination system may be employed by passing light through the aperture at the light line to objective lens 12. If an opaque card is employed as the document, the light is reflected from the image side of the card to objective lens 12.

The card feeding apparatus comprises the several devices that serve to feed the aperture cards seriatim from card magazine 9 to a card transport whereby they are moved past an optical system that is effective to project the data image onto the xerographic drum. After projection of the light images, the card is ejected from the transport and deposited in the receiving magazine 16.

Seriatim feeding of the cards is effected by means of an apparatus that is disclosed in Patent No. 3,383,105 issued May 14, 1968 in the name of R. R. Roberts. Data cards are placed in card magazine assembly 9 that includes front guide member 14 and rear guide member 16 for holding a stack of cards in alignment. The magazine is arranged to permit the feeding of cards from the bottom of the card stack and the magazine is adapted to retain the remaining cards in the stack as each bottom card is removed. A card weight 20 is provided to hold the cards in proper feeding relation.

For moving each card out of the magazine, the apparatus includes a movable base block 22 that supports the trailing edge of the card stack and is provided with an adjustable picker knife 24 arranged to engage the trailing edge of the bottommost card of the stack. Base block 22 is suitably mounted for sliding movement along the path of ejection of the card from the magazine, and is reciprocated in timed relation to the operation of the remainder of the card handling apparatus. For this purpose, a lever 26 is pivotally mounted on a stud 28 and is connected to the base block 22 by a suitable screw. The other end of lever 26 is connected to a crank arm keyed on a cam shaft 32. The cam shaft 32 is rotated periodically through a single revolution clutch, in timer relation to the remainder of the mechanism, whereby a single card is advanced from a card magazine 9, as required.

The feeding of a card is accomplished by first causing the pucker arm 34 to frictionally contact the edge of a bottommost card 36 and force it to pucker below the spines 38 and be maintained on its bottom side only by picker knife 24 and base block 22. Base block 22 and picker knife 24, operated by cam 32 forces the bottommost card 36 with a forward motion such that the card is released from magazine 9 and falls into contact with rotating rolls 44 and 46 to be carried thereby and by rolls 48 to card carriage 11.

The stack of cards 52 is held from dropping through the open lower end of the magazine 9 by the spines 38 which are attached to the magazine at places adjacent the leading edge side of the cards, that is the edge of the bottommost card 36 that will initially contact roller 44, on the side opposite by lip (not shown) formed as an integral part of magazine 9, and on the base block 22.

The pucker arm 34 operates on stack 52 in relation to the picker knife 24. The bottommost card 36 is engaged by the high frictional material 56 securely fastened or glued to the pucker arm 34. The motion of arm 34 is directed by eccentric 58 and pivot pins 60.

As each card leaves magazine 9, it is gripped successively by two sets of feed rollers 46 and 48 and advanced rearwardly to card carriage 11 of the reciprocal carriage assembly. The upper rolls of the feed roll combination are resiliently urged into engagement with the lower rolls in order to maintain proper contact with the existing card. The rolls are driven by power through the shaft of lower roll 46 which rotates continuously while the apparatus is in operation. The remaining rolls are positively driven through pinions fixed on each feed roll shaft and an idler pinion whereby the two upper rolls of the sets 46 and 48 are rotated counter-clockwise, as viewed in FIG. 1 and the lower rolls of the sets 46 and 48 are rotated clockwise to advance the card to carriage 11, which at this point of operation is directly aligned with the feed rolls to receive the card.

Immediately following the receipt and clamping of the aperture card, the carriage 11 is moved to the right, in a path of movement normal to the card feeding movement, to effect the image scanning operation to expose the photo sensitive surface of the card copying apparatus. After the image is scanned, the carriage 11 is returned to a position in alignment with the feed rolls and the card is ejected from the transport. Thereupon, it is engaged by lower feed roll 48 that is in frictional contact with an idler feed roll 62 that is rotatably mounted to be resiliently urged into contact with the lower feed roll 48. The continued driving action of feed roll 48 is thereby effective to move the card forwardly against a deflector plate 64 that causes the card to drop downwardly and come to rest on a support plate 66 in receiving magazine 68. The support plate 66 is urged upward by spring 70 in order to minimize the possibility of cards tumbling as they are ejected from the carriage 50 and, at the same time, to provide a support plate structure that moves downwardly as additional cards are added, against the tension of spring 70, whereby a substantial number of cards may be stacked in magazine 68 before it is necessary for the operator to remove them.

The card carriage assembly receives each minified data card from the feed rolls 48 and carries through the scanning cycle, i.e., the "scan" or exposure stroke and the return stroke, during continuous operation of the machine as more fully described in copending application by E. D. Hewes. In the normal stopping position of the system, the carriage assembly 11 is positioned at the end of its scan stroke of movement, in which it is out of register with the card magazine assembly 9. When the system is restarted, carriage 78 is immediately returned to a position in register with feed rolls 46 and 48 of the card magazine assembly to receive the next card for reproduction. The carriage is held momentarily in this position to permit the ejection of a card carried thereby, if any, and to receive a new card carriage and its several related operating mechanisms function to effect the several mechanical movements and electrical circuit connections of the card handling operation in proper sequence.

Specifically, card carriage assembly 11 includes the generally horizontally disposed card carriage 78 that is formed of a casting having a flat top surface or platen for supporting cards and a generally vertically disposed backing plate 80 to which the carriage 78 is secured along its rear edge. The plate 80 extends upwardly and is formed with bosses 81 and 82 through which is formed a longitudinal bore having suitable linear ball bushings 83. The carriage is adapted for lateral movement, relative to the card magazine assembly, on a shaft 84 which extends within the bushings 83. To maintain the carriage assembly 11 horizontal, it is provided with an extension 87 upon which is mounted an upper roller 88 and two lower rollers 90 at axes at right angles to shaft 84 and which ride on the upper and lower surfaces, respectively, of a rail 91 arranged parallel to shaft 84. By this structure, carriage assembly 11 is supported for movement on the shaft 84 while maintaining its card supporting surface in a substantially horizontal position throughout its path of movement.

For guiding data cards onto the carriage 78 card guide rails 92 and 93 are provided at opposite ends of the card clamping mechanism 94. In order to project a light image from a data card supported on the carriage 78, a rectangular aperture 96 is formed through the carriage. The aperture 96 is of a dimension slightly in excess of that of the data area imprinted on a card, and is positioned to underlie the data area when the card is positioned on the carriage. An optical glass insert 97 is positioned in the aperture 96 to provide a flat surface for supporting the data area. The upper plate pressure pad 101 is formed with a rectangular aperture 89 therein. Its dimensions are slightly in excess of the data of microfilm cards commonly used in the "unitized" system. This formation permits adaptability of the carriage to function in a unitized microfilm system or a semi-micro opaque system.

For clamping the data area of the card into scanning position, there is provided a spring loaded, cam operated, rectangular card clamping mechanism 94 which guides the cards ejected through rollers 48 into rails 92 and 93 formed as an integral part of, or securely attached to, pressure plate 101 of the card clamping mechanism. When a card is positioned in guide rails 92 and 93, the entire mechanism including the pressure pad portion 101 securely presses the data area of the data card against the insert 97 in the carriage so that the data area is securely pressed in a horizontal plane during the scanning operation. The carriage assembly 11 is in the start-off-scan position while ejecting and accepting cards from the card feeding rollers and receiving rollers 46, 48 and 62.

In order to actuate the card clamping mechanism 94 to permit the insertion, scanning, and removal of data cards the clamping mechanism is attached to two arms 98 and 99 that extend through suitable openings 100 formed in the backing plate 80 and are pinned on a shaft rotatably journaled in the plate 80 across the openings 100.

For operating the card clamping mechanism 94, arm 98 operates at a crank pivotable about the shaft rotatably journaled in the plate 80 and is provided with a cam follower 103 and its lower end that is adapted to be engaged by the high dwells of a cam 104 fixed on the cam shaft 32 which is rotated through a single revolution during each card feeding operation by a drive means, for example motor 95 through belt 102. The rigid crank assembly comprising a card clamping mechanism 94, arms 98 and 99, with the former formed as the crank, are resiliently urged counter-clockwise by a spring 105 extended between crank arm 98 and the outer edge of a bracket 106 fixed on the backing plate 80. The several parts of this assembly are so proportioned that they are limited in motion by contact between the card clamping mechanism 94 and the carriage surface so that the follower 103 is held slightly away from the low dwell of cam 104 while the carriage assembly 11 is in scanning position.

For properly positioning a card on carriage 78 after it is fed thereto, the apparatus includes a line-up plate 107, together with an actuating linkage. The plate 107 is formed with an offset lever portion 108 that is pivotally mounted on a stud 110 secured in a boss 111 on the underside of the carriage. A forked link 112 connects the mid-portion of a lever 113 mounted at its upper end of a rod 114 journaled in the backing plate 80. A follower 115 is rotatably mounted on the lower end of the lever 113 and is adapted to engage the high dwell of a cam 116 that is also fixed on cam shaft 50. A spring 117 is extended between a fixed anchor 118 and the upper portion of the lever portion 108 and functions to urge the plate 107 against the forward edge of carriage 78 and to urge the follower 115 into cantact with the cam 116. However, the dimensions of the parts are such that contact between the plate 107 and the carriage limits the rearward movement of follower 115 to a position in which a slight clearance is maintained between it and the lower dwell of the cam 116.

In operation, the plate 107 is rocked counter-clockwise to the position shown in FIG. 3 immediately prior to the time a card is fed from feed rolls 48 so that the card has unimpeded passageway onto the card carriage. The high dwell of cam 116 is such that when a card is completely passed over the plate 107, the plate is restored to the forward edge of carriage 78 by the spring 117 and serves to urge the card rearwardly to place it accurately in scanning position.

For ejecting a card during a card changing cycle, two ejector pins 120 are slidably journaled in bores 121 drilled through the plate 80 and extending for a slight distance onto the upper surface of carriage 78. The ejector pins 120 are normally held in their rearward position, and are provided with square forward ends that engage the rearward edge of a card positioned on the carriage 78. The rearward ends of pins 120 are connected to a transverse rod 122 that is rotatably retained between the arms of a pair of bifurcated cranks 124 pivotally supported on the lower edge of the backing plate 80. Also pivotally supported on the arms 126 along the pivotal axis for the cranks 124 is a bar 127 which, when rotated in a counter-clockwise direction are adapted to engage and rotate the cranks 124 causing outward movement of the card ejector pins 120 along the carriage 78 for ejecting a card therefrom.

For operating the several cam controlled mechanisms of the carriage assembly 11, as well as the card feeding mechanism, there is provided a motor 95 that is connected to the cam shaft 32. The several mechanisms, including the card carriage assembly 11 and the card feeding mechanism, are caused to function in timed relation to the remainder of the copying system. The motor is effective to drive the cam shaft 32 through a single revolution for each card fed and scanned. When this occurs the line-up plate 107 is first rocked downward or counter-clockwise, to remove it from the path of movement of a card. Immediately thereafter, the card clamping mechanism 94 is elevated slightly by the first high dwell of cam 104 to release the card, if any, held on the carriage 78. The elevation of clamping mechanism 94 need be only enough to release the pressure exerted by clamping mechanism 94 on the card retained in rails 92 and 93. Thereupon, ejector pins 120 are made to eject the card from the magazine and are immediately withdrawn to their rearward positions. The card clamping mechanism 94 is then raised to its card accepting position as cam follower 103 is maneuvered by the maximum high dwell of cam 104.

At this point, the bottommost card held in card magazine 9 is ejected through feed rollers 46 and 48 and into the rail guides 92 and 93 of the card clamping mechanism. As the card clamping mechanism is lowered to the card scanning position, the plate 107 is rocked clockwise to position the card accurately on the carriage. As this is accomplished, the card clamping mechanism 94 is firmly lowered to press the data area of the card into register with rectangular aperture 96 in the carriage. The entire card carriage assembly 11 then moves laterally to the left over a scanning aperture which illuminates the data which has been firmly pressed on glass platen 97 overlaying rectangular aperture 96 and exposing such data through an optical system to the photosensitive surface of the xerographic drum 10. The entire carriage assembly 11 then returns along shaft 84 to the start-of-scan position where the cycle again commences by ejecting the previously projected card and accepting a card-to-be-projected.

While the invention has been described with reference to the structure disclosed herein, it is not to be confined to the specific details set forth or to the specific environment set forth. Modifications or changes may readily become apparent to those skilled in the art, and therefore, this application is intended to cover such modifications or changes as may come within the purposes of the improvements of the scope of the following claims.

What is claimed is:

1. In a card handling apparatus for moving data carrying cards past a scan slit while protecting the sensitive areas on the card and having associated therewith a card feeder adapted to insert a card into a movable card transport carriage apparatus and having further associated therewith a deposit bin adapted to receive cards, said carriage apparatus comprising a platen having a suitable transparent cover therein over which the data portion of the card is positioned to traverse the scan slit, a pressure plate, means to bias said pressure plate in touching contact with said platen cover when said carriage apparatus is moving the card past the scan slit, rail means intimately attached to said pressure plate and adapted to hold a card by the edges thereof when fed therein by the card feeder, said rail means being positioned to maintain the card between said pressure plate and said platen cover, programmer means to remove said pressure plate and rail means from said biased position when a card is to be inserted into said rails or removed therefrom, and means operatively associated with said programmer means to eject said card from said rail means into a deposit bin.

2. In a card handling apparatus for moving data carrying cards past a scan slit while protecting the sensitive areas on the card and having associated therewith a card feeder adapted to insert a card into a movable card transport carriage and having further associated therewith a deposit bin adapted to receive cards, said carriage comprising a platen having a suitable transparent cover therein over which the data portion of the card is positioned to traverse the scan slit, a pressure plate, means to bias said pressure plate in touching contact with said platen cover when said carriage is moving the card past the scan slit, rails intimately attached to said pressure plate and adapted to hold a card by the edges thereof when fed therein by the card feeder, said rails being positioned to maintain the card between said pressure plate and said platen cover, a programmer adapted to remove said pressure plate and rails from said biased position when a card is to be inserted into said rails or removed therefrom, said programmer having an actuator member operable upon said pressure plate and rails to position them in a card insert position, such position aligning the rails attached to said pressure plate with the card feeder for insertion of the card therein; a transport position where the card is pressed against the platen cover by said pressure plate and held in touching contact with both said pressure plate and said platen cover, said rails positioned to be inserted into the slotted portions of said carriage; and an ejection position where the card is spaced between said platen cover and said pressure plate, such position aligning said rails attached to said pressure plate for ejection of a card therein to a deposit bin.

3. In a card handling apparatus for moving data carrying cards past a scan slit while protecting the sensitive areas on the card and having associated therewith a card feeder adapted to insert a card into a movable card transport carriage and having further associated therewith a deposit bin adapted to receive cards, said carriage comprising a platen having a suitable transparent cover therein over which the data portion of the card is positioned to traverse the scan slit, a pressure plate, means to bias said pressure plate in touching contact with said platen cover when said carriage is moving the card past the scan slit, rails intimately attached to said pressure plate and adapted to hold a card by the edges thereof when fed therein by the card feeder, said rails being positioned to maintain the card between said pressure plate and said platen cover, a programmer adapted to remove said pressure plate and rails from said biased position when a card is to be inserted into said rails or removed therefrom wherein said programmer comprises cam means with a first high dwell and a second high dwell therein, the second being greater than the first, cam follower means adapted to ride on said cam, an arm attached at one end to said pressure plate and at the other end to said cam follower, drive means to rotate said cam means in a direction whereby said follower is engaged by said first high dwell prior to said second high dwell, ejection means operable when said cam follower reaches said first high dwell whereby said pressure plate is lifted from said platen cover and the card supported in said rail is spaced between said pressure plate and said platen cover and ejected from said rails into the deposit bin.

References Cited

UNITED STATES PATENTS 2,443,281 6/1948 Terry.
2,494,599 1/1950 Weckbaugh.

JOHN M. HORAN, Primary Examiner